Dec. 6, 1955 A. H. BAKER 2,725,680
ANNEALING LEHR
Filed July 17, 1953 4 Sheets-Sheet 1

INVENTOR.
ARVID H. BAKER
BY
Oscar L. Spencer
ATTORNEY

Dec. 6, 1955　　　A. H. BAKER　　　2,725,680
ANNEALING LEHR
Filed July 17, 1953　　　4 Sheets-Sheet 2

INVENTOR.
ARVID H. BAKER
BY
Oscar L. Spencer
ATTORNEY

Dec. 6, 1955  A. H. BAKER  2,725,680
ANNEALING LEHR
Filed July 17, 1953  4 Sheets-Sheet 3

INVENTOR.
ARVID H BAKER
BY
Oscar L Spencer
ATTORNEY

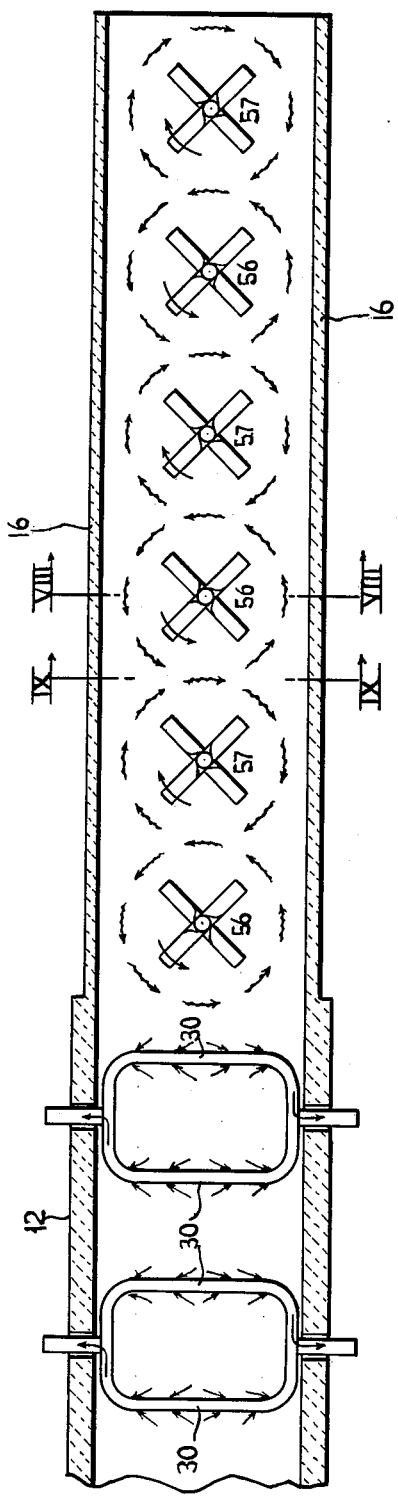
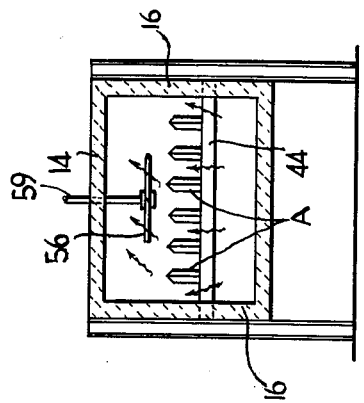
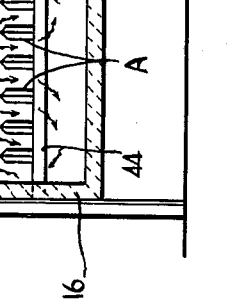
Dec. 6, 1955          A. H. BAKER          2,725,680
ANNEALING LEHR
Filed July 17, 1953                    4 Sheets-Sheet 4
INVENTOR.
ARVID H. BAKER
BY
Oscar L. Spencer
ATTORNEY United States Patent Office 2,725,680
Patented Dec. 6, 1955

2,725,680

ANNEALING LEHR

Arvid H. Baker, Port Allegany, Pa., assignor to Pittsburgh Corning Corporation, Allegheny County, Pa., a corporation of Pennsylvania Application July 17, 1953, Serial No. 368,716

10 Claims. (Cl. 49—47)

This invention pertains to annealing lehrs of the type embodying means for maintaining graduated zones of temperature longitudinally of the lehr and means for moving the material being annealed through these zones. The invention is specifically directed to the annealing of cellular glass which requires rather specific and defined zones of temperature, but is not limited in application to this specific material.

One object of the present invention is the construction and heating of lehrs for the intended purpose in which substantially uniform temperature is maintained throughout a plane transversely of each zone.

Another object of the invention is the provision of means for providing substantially vertical as opposed to transverse circulation of air currents through and about the materials being annealed.

A further object of the invention is a novel arrangement of vertically mounted fans for maintaining two way vertical circulation of air currents within the effective zone of each fan and without substantial lateral movement of air currents between adjacent effective zones of such fans disposed longitudinally of the lehr.

These and other objects will become apparent as the description proceeds.

Cellular glass is a product which is used as an insulator and as a lightweight impermeable substitute for cork in life rafts, floats and other like purposes. This product comprises myriad gas cells enclosed by thin glass walls formed by heating glass to a softened condition and expanding the glass by means of entrapped gases therein. One successful method is to mix pulverized glass and carbon, heat the mixture in closed molds to soften the glass into a cohered mass, and upon increasing the temperature the entrapped carbon reacts with sulfides in the glass to generate gases which expand and cellulate the glass. The process of preparing cellular glass is well known in the patented art.

After the cellulated glass is removed from the molds, it must be annealed and it is this annealing which is the subject of the present invention. Cellular glass due to its structure is very brittle because of the thin glass walls of the cells. It is also a product which is difficult to anneal since it is a very poor conductor of heat. Hence, the annealing cycle includes slow reheating of the product after removal from the molds and then slowly reducing the temperature while avoiding sudden temperature changes which would cause breaking or cracking. Hence the need for elimination of all strong air currents cutting across a plurality of the annealing zones.

Referring now to the drawings, Fig. 1 is a view in elevation of a lehr embodying the invention;

Fig. 7 is a longitudinal cross-section of a lehr similar to that of Figs. 1–6 in which only one row of fans is employed in the cooling portion of the lehr rather than a plurality of rows;

Fig. 8 is a transverse vertical section through the lehr as indicated by lines VIII—VIII of Fig. 7, and Fig. 9 is a transverse vertical section through the lehr as indicated by lines IX—IX of Fig. 7.

Figure 1:
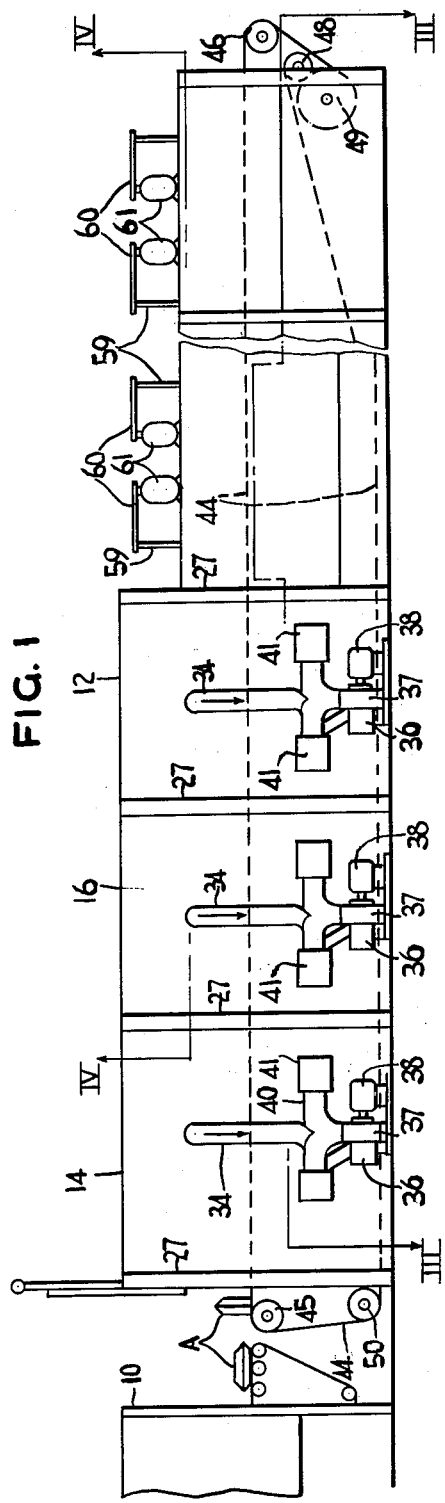

Referring now in detail to the drawings wherein like reference characters refer to like parts, reference character 10 indicates the discharge end of a cellular glass heating and cellulating furnace, reference character 12 the annealing lehr, and reference character 13 a conventional representation of means for receiving the product discharged from lehr 12.

Lehr 12 is essentially an elongated hollow tunnel having a roof 14, side walls 16, bottom wall 18 and having appropriate movable end closure walls of suitable design forming no part of the present invention. Roof 14 has a downwardly offset portion 20 adjacent the discharge end of the lehr. The bottom wall has upwardly offset portions 22, 23 and 25 the purpose of which will be described later. The side walls are suitably reinforced by vertical members 27 of suitable design.

Figure 2:
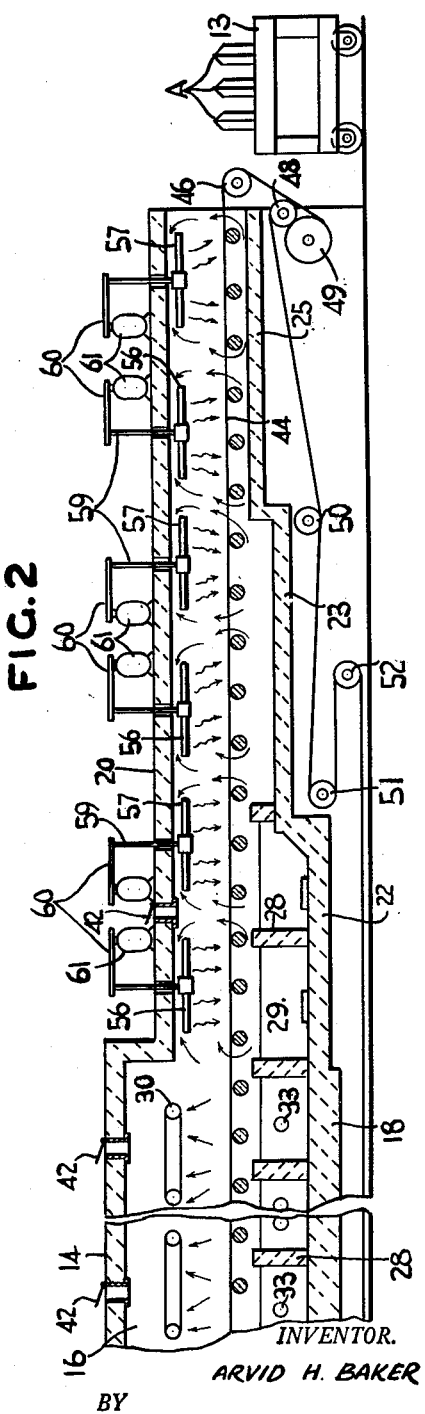
Fig. 2 shows in vertical cross-section a portion of the lehr of Fig. 1.
Figure 3:
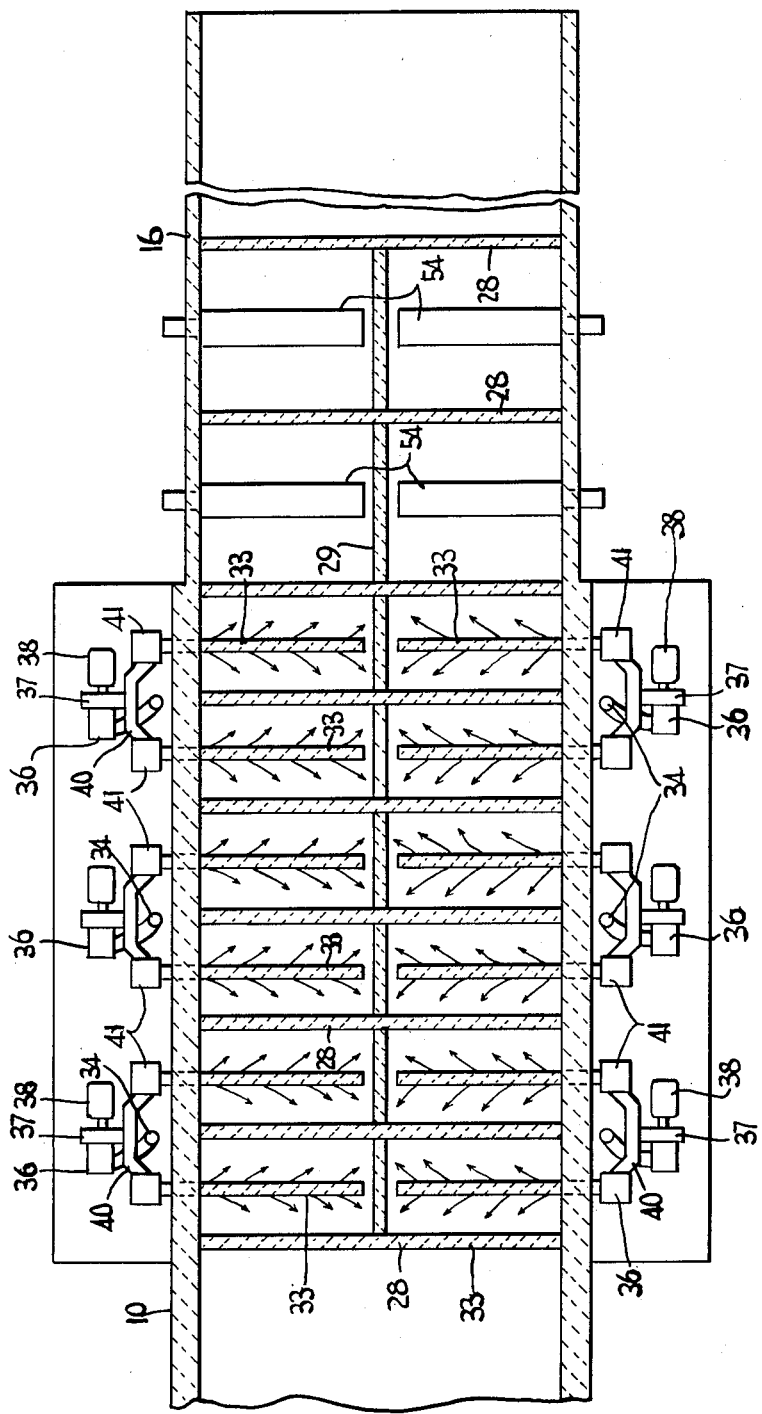
Fig. 3 shows a longitudinal cross-section taken along lines III—III of the lower portion of the lehr shown in Fig. 1.

As illustrated in Figs. 1 and 2, the lehr is comprised of a plurality of longitudinally disposed temperature zones some of which require outside heat and others which utilize the residual heat in the product being annealed. The heated zones are shown as being six in number. It will be understood, however, that this number may be increased or decreased as required. Each heated temperature zone of the lehr comprises a pair of transverse baffle walls 28 connected by a longitudinally disposed baffle wall 29 located substantially intermediate the side walls 16. Each pair of walls 28 thus substantially define a temperature zone transversely of the lehr and the wall 29 prevents excessive transverse currents within the lower portion of the heated zone.

Each heated temperature zone includes an upper or outlet conduit 30 and a lower or inlet conduit 33 which extend into the zone through the sidewalls 16. Each conduit 30 and 33 is perforated for a substantial portion of its length to receive or discharge a gas. Exteriorly of the lehr each outlet conduit 30 is connected through a vertical conduit 34 with a receiver 36 to the center of a vertical impeller fan 37 actuated by motor 38. The gases are directed into the center of the impeller fan 37 and impelled outwardly by centrifugal force to conduit 40 which is connected to the periphery of the impeller fan housing. For purposes of economy adjacent outlet conduits 30 may be connected together at opposite ends, Figs. 2 and 4 of the drawings, and may then be serviced by one outside vertical conduit 34, fan 37 and motor 38. Each inlet conduit 33 extends through the adjacent side wall 16 and is connected to a suitable gas burner or other heating device 41. The burner 41 is supplied with suitable fuel lines (not shown). Each burner 41 and inlet conduit 33 is connected by a suitable conduit 40 with the fan 37. Each burner 41 is preferably capable of individual adjustment so as to control the temperature of gases admitted to the lehr through its associated inlet conduit 33.

By reason of gases of combustion being constantly admitted through conduits 33 from burners 41, there is a tendency to build up pressure within these zones which would induce flow of gases from one zone to another longitudinally of the lehr. Therefore, manually controlled exhaust outlets 42 are provided in the lehr roof to exhaust these excess gases. These exhaust outlets 42 may be of any suitable form and may be controlled manually.

Intermediate the inlet and outlet conduits 30 and 33, and extending longitudinally of the lehr is a conveyor belt 44 for transporting articles through the lehr. Belt 44 is continuous and is mounted on suitably disposed rollers 45 and 46 at the inlet and exit ends of the lehr. A suitable drive and tightening device for belt 44 is illustrated as 48, 49, 50, 51 and 52. Suitable rollers 54 support conveyor belt 44 within the lehr.

Referring now to the area of the lehr adjacent the discharge end thereof, wherein residual heat within the article being annealed is utilized to maintain temperature zones, fans 56 and 57 are substituted for the conduits 30 and 33. These fans are mounted in pairs transversely of the lehr and rotate in opposite directions. These pairs of fans are spaced longitudinally of the lehr and the direction of their rotation is such that the direction of rotation of any one fan is opposite in direction to each adjacent fan disposed longitudinally or transversely of the lehr. The blades of each fan are constructed so that the pitch of the blades of each fan is opposite to that of the blades of each adjacent fan both longitudinally and transversely of the lehr.

The effect on air currents within the lehr as a result of the foregoing method of operation of the fans is to provide substantially vertically downwardly flowing air currents directly beneath the fan and upwardly flowing air current between the fans, and between the fans and the adjacent lehr side walls. The fans are of the propelling type and vertically mounted on shafts 59 extending through the roof of the lehr. Any suitable drive mechanism 60 may be used to connect shafts 59 to motors 61. Suitable means may be included in the drive mechanism 60 so that the speeds of fans 56 and 57 may be varied if desired.

Figure 4:
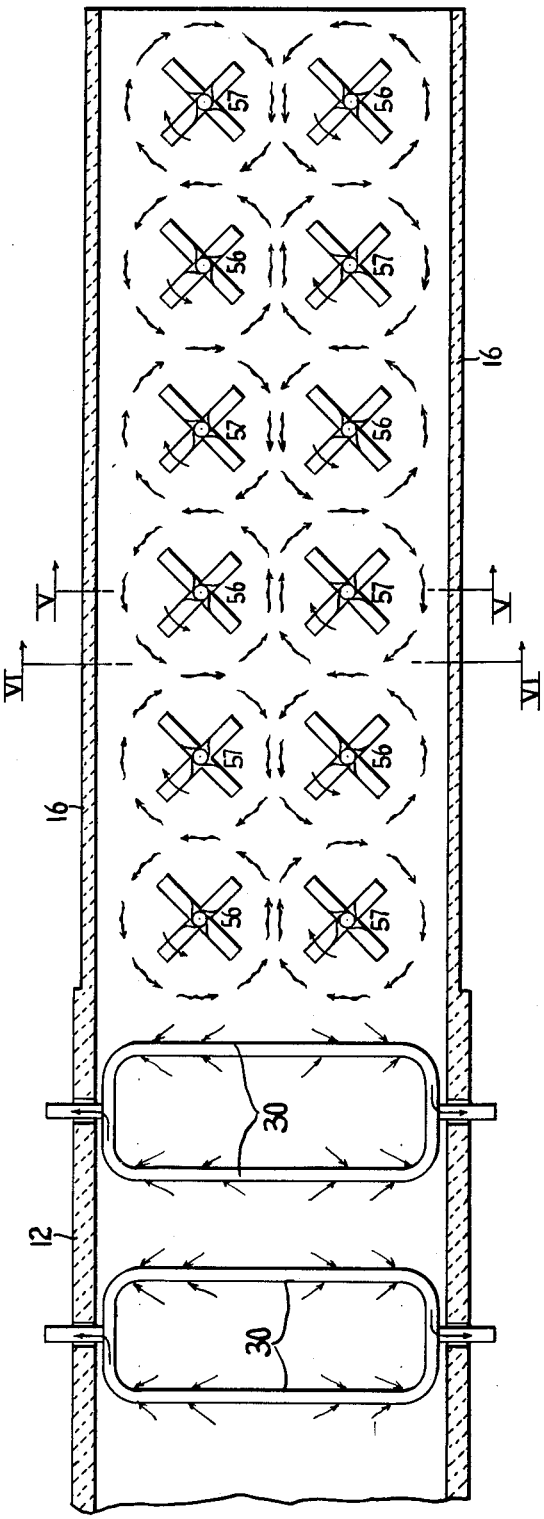
Fig. 4 is a longitudinal cross-section of the lehr at line IV—IV of Fig. 1 in the zone above the products being annealed.
Figure 6:
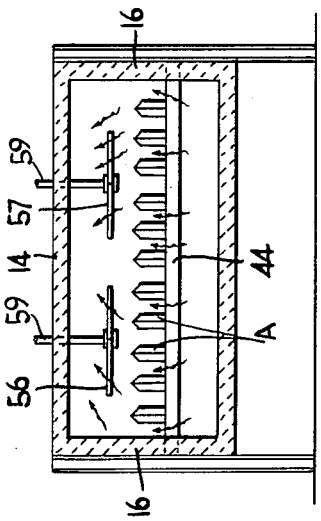
Fig. 6 is a transverse vertical section through the lehr as indicated by lines VI—VI of Fig. 4.
Figure 5:
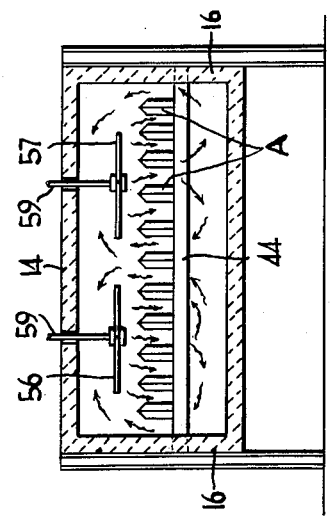
Fig. 5 is a transverse vertical section through the lehr as indicated by lines V—V of Fig. 4.

Referring now to Figs. 4, 5 and 6 of the drawings, Fig. 4 has indicated thereon the arrangement of the respective fans 56 and 57. It will be observed that all fans 56 rotate in the same direction, which in the drawing is indicated as counter-clockwise. All fans 57 rotate in one direction, but in the opposite direction to that of fans 56. In other words, fans 57 are indicated as rotating in a clock-wise direction. The direction of movement of air currents set up by each fan is indicated by arrows having wave shaped shafts. Upon reference to Fig. 5 it will be observed this figure represents a transverse vertical section through the axis of rotation of both fans 56 and 57. Here the wavy shafted arrows indicate substantially vertically downward air currents directly beneath the fans and upwardly directed air currents between the fans and between each fan and the adjacent lehr side wall. Similarly, in Fig. 6 which is a transverse vertical section through the lehr and between the fans as indicated by lines VI—VI of Fig. 4 the air currents within this area are flowing in an upwardly direction. Combining disclosures of Figs. 4, 5 and 6, it will be apparent that the counter rotations of adjacent fans prevent longitudinal movement of air currents within the lehr and provide substantially vertical movement of air currents in opposite directions beneath and adjacent each fan. Hence, each transverse pair of fans 56 and 57 provides a transverse zone within which the temperature is maintained substantially uniform by utilizing residual heat within the articles moving through the zone upon the conveyor 44.

A further embodiment of the invention as illustrated by Figs. 4, 5 and 6 is shown in Figs. 7, 8 and 9. In this embodiment, a single row of fans is disposed longitudinally and centrally within the lehr and mounted for rotation about vertical axes, instead of a plurality of rows of fans as shown in Fig. 4. The blades of the fans 56 and 57 are constructed so that the pitch of the blades of each fan is opposite to that of the blades of each adjacent fan. The direction of rotation of each fan is also opposite to that of each adjacent fan. The fans 56 and 57 are vertically mounted on shafts 59 extending through the roof of the lehr and connected to motors 61 by suitable drive mechanisms 60.

Here again, the effect of currents within the lehr as a result of such operation of the fans 56 and 57 is to provide substantially vertically downwardly flowing currents directly beneath the fans and upwardly flowing currents between the fans, and between the fans and adjacent lehr side walls. The vertical movement of the currents set up by each fan in the embodiment shown in Fig. 7 is indicated by arrows having wavy shafts in Figs. 8 and 9. In Fig. 8, which is a transverse vertical section through the axis of rotation of the fan 56, the arrows indicate substantially downward movement of the air directly beneath the fan and upward movement between the fan and the adjacent lehr side walls. In Fig. 9, which is a transverse vertical section through the lehr and between the fans as indicated by lines IX—IX of Fig. 7, air currents are shown to be moving upwardly in this area between the fans.

Referring again to Fig. 2 of the drawings, the stepped portion 22 of the bottom wall of the lehr and beneath the first group of four fans is provided with transverse walls 28 and longitudinal dividing wall 29. This, in effect, provides a four walled enclosure beneath each fan. The articles being annealed beneath these first four fans are just moving out of temperature zones into which additional heat is provided and into zones in which the residual heat of the product being annealed is utilized. The necessity for uniformity of temperature in each zone beneath each fan necessitates use of these walls 28 and 29. In cases where less uniformity of temperature control is needed, these walls 28 and 29 may be omitted. Each of the remaining stepped portions 23 and 25 of the lehr bottom wall reduces the space beneath the conveyor belt 44 and the lehr bottom wall. This reduced spacing also makes unnecessary walls 28 and 29 for reasons hereinafter set forth.

Referring now to Figs. 2, 5 and 8 of the drawings, air currents moving from beneath each fan move downwardly and impinge upon the lehr bottom wall. These impinging air currents therefore tend to build up a cushion of air upon the bottom wall. Within this air cushion the air currents tend to flow outwardly from beneath the impinging air and thence upwardly in the zones between the fans. Obviously therefore, the air cushions thus formed tend to fill the space beneath the conveyor belt and the lehr bottom wall making walls 28 and 29 unnecessary.

The horizontal component of the currents created by the fans 56 and 57 within the cooling end of the lehr is shown in Figs. 4 and 7. It can be seen that the horizontal component of the currents created by fans 56 is counterclockwise when viewed from below and the horizontal component of the currents created by fans 57 is clockwise when viewed from below. It can also be seen that there is a slight mixing of these currents created by each fan with each other. The horizontal component of these currents brings warmer air into contact with cooler air at each zone of mixing and enables the production of a temperature gradient throughout the length of the cooling portion of the lehr.

Referring now to Figs. 1 and 2 of the drawings, the cellular glass within the molds moves out of the cellulating furnace 10. The molds are removed and the cellular glass slabs A are placed upon conveyor belt 44 so as to move through the lehr 12. Within the heated zones of the lehr, uniform temperature is maintained by introducing heated gases from conduits 33 below the conveyor 44. Due to individually controlled heating means 41 associated with each inlet conduit 33, substantial horizontal uniformity of temperature is maintained between each opposing inlet conduits 33 and adjacent outlet conduit 30. Likewise walls 28 and 29 define zones of heat about each inlet conduit 33. Hence, having outlet conduit 30 above each inlet conduit 33, definite transverse temperature zones are maintained longitudinally of the lehr, without detrimental mingling of the two differently heated streams of gases flowing between the adjacent vertically disposed pairs of conduits 30 and 33. Due to the foraminous nature of the conveyor belt 44 and the spacing of slabs A thereon, as indicated in Figs. 5 and 6, the vertical movements of the air currents are relatively unimpeded. As the slabs A move beneath fans 56 and 57, the slabs are being cooled, so that the cooling air currents move downwardly from the fans between the slabs A and through belt 44 to impinge upon the bottom of the lehr and return to the top of the lehr as hereinbefore set forth.

By the use of the foregoing apparatus, operated in the manner described, certain advantages are secured which are of extreme importance in annealing cellular glass. As is well known in the patented art, cellular glass is an extremely critical material to anneal. Due to the process of manufacture and the multiplicity of cells forming the product, it is not only very brittle before annealing but is also a very poor conductor of heat. The result of the foregoing is that the interior cells are soft and still expanding while the exterior cells have hardened as the product is removed from the mold and placed in the annealing lehr. Obviously then, any pronounced draft longitudinally through the lehr, as is usual in the heretofore known types of lehr construction, would cause undesired chilling of the exterior surface of the slabs and result in fractures of the exterior surface. Hence, the necessity for prevention of longitudinal movements of air currents within the lehr.

As set forth above, the herein disclosed and described apparatus very effectively prevents such undesirable longitudinal movements of air. Also, since the material is such a poor conductor of heat, the temperature increases and decreases must be obtained in a very uniform and gradual manner. Therefore, the disclosed apparatus by maintaining uniformity in a horizontal plane transversely of the lehr provides uniform heating and cooling of the product. Because of the low thermal conductivity of the product, a period of as high as 24 hours is often required to safely and efficiently anneal the slabs. This slow movement of the slabs through the lehr permits the obtaining of uniform temperatures throughout the cross-sectional area of the slabs.

Although the present invention has been described with reference to specific details of certain embodiments thereof, it is not intended that such details shall be regarded as limitations upon the scope of the invention except insofar as included in the accompanying claims.

This application is a continuation-in-part of my co-pending application Serial No. 120,196, filed October 7, 1949, and now abandoned.

I claim:

1. An annealing apparatus comprising an elongated tunnel-like lehr, a conveyor movable longitudinally through the lehr, a longitudinally disposed row of fans mounted within the lehr for rotation about vertical axes, each of said fans having blades whose pitch is opposite to that of the blades of each adjacent fan, and means for roating each fan in a direction opposite to that of each adjacent fan.

2. An annealing apparatus comprising an elongated tunnel-like lehr, a conveyor movable longitudinally through the lehr, a plurality of longitudinally disposed rows of fans mounted within the lehr for rotation about vertical axes, the fans in each row being in line transversely of the lehr with a corresponding fan of the adjacent row, each of said fans having blades whose pitch is opposite to that of the blades of each adjacent fan both transversely and longitudinally of the lehr, and means for rotating each fan in a direction opposite to that of each adjacent fan both transversely and longitudinally of the lehr.

3. An annealing apparatus comprising an elongated tunnel-like lehr, a conveyor movable through the lehr, means spaced longitudinally of a portion of said lehr providing a series of individually controlled heated zones and means spaced longitudinally of a portion of the lehr providing a series of cooled zones, said latter means comprising a longitudinally disposed row of fans mounted within the lehr for rotation about vertical axes, each of said fans having blades whose pitch is opposite to that of the blades of each adjacent fan, and means for rotating each fan in a direction opposite to that of each adjacent fan.

4. An annealing apparatus comprising an elongated tunnel-like lehr, a conveyor movable through the lehr, means spaced longitudinally of a portion of said lehr providing a series of individually controlled heated zones and means spaced longitudinally of a portion of the lehr providing a series of cooled zones, said latter means comprising a plurality of longitudinally disposed rows of fans mounted within the lehr for rotation about vertical axes, the fans in each row being in line transversely of the lehr with a corresponding fan of the adjacent row, each of said fans having blades whose pitch is opposite to that of the blades of each adjacent fan both transversely and longitudinally of the lehr, and means for rotating each fan in a direction opposite to that of each adjacent fan both transversely and longitudinally of the lehr.

5. In an annealing apparatus including an elongated tunnel divided into a longitudinal spaced series of individually controlled temperature zones and a conveyor belt extending longitudinally of the tunnel dividing same into upper and lower zones, the combination of a longitudinally spaced series of transveresly disposed pairs of vertically mounted fans within the upper zone, each of said fans transversely and longitudinally of said tunnel having blades whose pitch is opposite to that of the blades of each adjacent fan both transversely and longitudinally of the lehr, and means for rotating each fan in a direction opposite to that of each adjacent fan both transversely and longitudinally of the lehr, thereby providing vertical blasts of air upon the conveyor, and vertically returning air currents moving between said vertical blasts of air, to provide a substantially uniform temperature within a temperature zone defined by each transverse pair of fans.

6. In an annealing apparatus, the combination of an elongated tunnel, a conveyor moving longitudinally of the tunnel for conveying articles to be annealed, and means for maintaining a longitudinal series of independent temperature zones within a portion of said tunnel and substantially free of longitudinally moving air currents comprising a longitudinal series of transversely disposed pairs of oppositely rotating vertically mounted fans above the conveyor, each pair of fans having blades whose pitch is opposite to that of the blades of each adjacent fan, both transversely and longitudinally of the lehr and defining a temperature zone in which air currents move downwardly beneath each fan and upwardly between each fan and between each fan and the adjacent tunnel wall, said air currents maintaining substantially uniform temperature in any horizontal plane within each temperature zone by circulation of heat given off by the articles moving longitudinally of the tunnel upon said conveyor, and means for rotating each fan in a direction opposite to that of each adjacent fan both transversely and longitudinally of the lehr.

7. Apparatus for annealing slabs of cellular glass heated above the critical temperature, said apparatus comprising an elongated tunnel-like lehr, a conveyor belt moving longitudinally of the lehr for carrying the slabs, and two longitudinally disposed rows of propeller fans mounted above the belt within the lehr for rotation about vertical axes to direct streams of air upon the slabs, the fans in each row being in line transversely of the lehr with the corresponding fan of the adjacent row, each fan having blades whose pitch is opposite to that of the blades of each adjacent fan both transversely and longitudinally of the lehr, and means for rotating each fan in a direction opposite to that of each adjacent fan both transversely and longitudinally of the lehr to create transverse substantially uniform temperature zones spaced longitudinally of the lehr and without substantial flow of air longitudinally of the lehr.

8. In an annealing apparatus including an elongated tunnel divided into longitudinally spaced series of individually controlled temperature zones and an apertured conveyor belt extending longitudinally of the tunnel, the combination of a pair of transversely spaced, vertically mounted fans within each of a plurality of adjacent zones at one end of the tunnel, each of the fans having blades whose pitch is opposite to that of the blades of each adjacent fan both transversely and longitudinally of the lehr, and means for rotating each fan in a direction opposite to that of each adjacent fan both transversely and longitudinally of the lehr, thereby providing vertical currents of the air downwardly upon and through the conveyor belt to impinge upon the tunnel floor and vertically returning currents of air moving between the downwardly directed currents and adjacent the opposite tunnel side walls to provide substantially uniform temperature within the zone from the residual heat within the material moving through the zone upon the conveyor belt.

9. An annealing apparatus comprising wall means forming a tunnel-like lehr, a conveyor means extending longitudinally of the lehr for carrying articles to be annealed through said lehr and dividing the lehr into upper and lower zones, transverse baffles extending upwardly from the bottom wall of the lehr and terminating below said conveyor means, longitudinal baffles extending upwardly from the bottom of the lehr and intercepting a vertical plane of the transverse baffles, and means for providing vertical circulation of gases within vertical zones defined by said intercepting longitudinal and transverse baffles including an inlet member extending through a side wall of the lehr between adjacent transverse baffles below the conveyor means, an outlet member disposed above the conveyor means between the vertical planes of said transverse baffles and extending through a tunnel side wall, individually controlled heating means connected to each inlet member, and pressure producing means connected to each heating means and with each adjacent outlet means to provide vertical circulation of gases within the zones defined by the vertical planes of said transverse baffles.

10. In an annealing apparatus, in combination, wall means forming a hollow elongated tunnel, conveyor means extending longitudinally of the tunnel and dividing the tunnel into upper and lower zones, transverse baffles extending upwardly from the bottom wall of said tunnel and terminating below said conveyor means, said transverse baffles being intercepted and connected by a longitudinal baffle disposed upon the tunnel bottom wall intermediate the tunnel side walls, and means providing vertical circulation of gases within vertical zones defined by said intersecting longitudinal and transverse baffles such latter means including an inlet member extending through each tunnel side wall between adjacent transverse baffles below the conveyor, an outlet member disposed above the conveyor between the vertical planes of said transverse baffle members and extending through each tunnel side wall, individually controlled heating means disposed exteriorly of said tunnel and connected to each inlet member, fan means connected to each heating means and with each adjacent outlet means to provide vertical circulation of gases within the zones defined by the vertical planes of said transverse baffle means.

References Cited in the file of this patent
UNITED STATES PATENTS

| | | |
|---|---|---|
| 620,139 | Hysore | Feb. 28, 1899 |
| 1,979,216 | Morton et al. | Oct. 30, 1934 |